United States Patent [19]

Sakai et al.

[11] Patent Number: 5,368,120
[45] Date of Patent: Nov. 29, 1994

[54] FOUR WHEEL DRIVE VEHICLE WITH SLIP CONTROL SYSTEM

[75] Inventors: Takeshi Sakai, Chiryu; Keiichiro Banzai, Toyota; Yuichi Imani, Hamamatsu; Katsuo Sakurai, Nagoya, all of Japan

[73] Assignee: Nippondenso Co., Ltd., Kariya, Japan

[21] Appl. No.: 974,411

[22] Filed: Nov. 12, 1992

[30] Foreign Application Priority Data

Nov. 12, 1991 [JP] Japan ................... 3-295885

[51] Int. Cl.$^5$ ............................................ B60K 28/16
[52] U.S. Cl. ................................ 180/197; 180/243; 180/65.2
[58] Field of Search ............ 180/197, 242, 243, 65.2, 180/65.4, 65.3

[56] References Cited

U.S. PATENT DOCUMENTS

| | | | |
|---|---|---|---|
| 4,236,595 | 12/1980 | Beck et al. | 180/197 |
| 4,399,886 | 8/1983 | Pollman | 180/197 |
| 4,401,182 | 8/1983 | Pollman | 180/197 |
| 4,444,286 | 4/1984 | Hawkins et al. | 180/197 |
| 4,635,743 | 1/1987 | Riehl | 180/243 |
| 4,738,332 | 4/1988 | Wright | 180/197 |
| 5,147,010 | 9/1992 | Olson et al. | 180/243 |

FOREIGN PATENT DOCUMENTS

| | | | |
|---|---|---|---|
| 2920063 | 11/1980 | Germany | 180/243 |
| 53-128828 | 11/1978 | Japan . | |
| 54-324 | 1/1979 | Japan . | |
| 60-91524 | 6/1985 | Japan . | |
| 62-258822 | 11/1987 | Japan . | |
| 63-255128 | 10/1988 | Japan . | |
| 63-258223 | 10/1988 | Japan . | |

Primary Examiner—Richard M. Camby
Assistant Examiner—Kevin Hurley
Attorney, Agent, or Firm—Cushman, Darby & Cushman

[57] ABSTRACT

A drive apparatus for driving front and rear wheels of a motor vehicle, either the front and rear wheels being mechanically driven, through a power transmission mechanism, by a motive power generated by an engine of the motor vehicle and the other wheels being driven by hydraulic motors rotationally driven by a hydraulic pump. The drive apparatus limits driving forces of the other wheels, rotationally driven by the hydraulic motor, to be below a predetermined driving force and further detects occurrences of acceleration slips of the one wheels, rotationally driven through the power transmission mechanism, on the basis of speeds of the other wheels in which the driving force is limited to be below the predetermined driving force. The driving forces of the one wheels are adjusted in accordance with the acceleration slip detection result so as to suppress the occurrences of the acceleration slips. This arrangement can improve the travelling stability of the motor vehicle and the motive power on a low friction coefficient road surface without requiring a complex structure.

8 Claims, 7 Drawing Sheets

1

FOUR WHEEL DRIVE VEHICLE WITH SLIP CONTROL SYSTEM

BACKGROUND OF THE INVENTION

The present invention relates to a drive apparatus for use in a four-wheel driven type motor vehicle.

With a viewpoint of safety and diversification, a four-wheel drive system (which will be referred hereinafter to as 4WD) and a traction control system (which will be referred hereinafter to as TRC) are being widely introduced in motor vehicles. In a conventional TRC, when the rotational speed of the driven wheel becomes higher than the rotational speed of the non-driven wheel, which does not slip irrespective of acceleration of the motor vehicle, a decision is made that the acceleration slip occurs in the driven wheel, thereby activating traction control. Accordingly, the TRC is generally applied to two-wheel driven type motor vehicle (which will be referred hereinafter to as 2WD vehicle). On the other hand, a conventional 4WD vehicle is equipped with a power transmission to transfer engine power to the front, rear, left and right wheels. The power transmission comprises a clutch, a transmission (speed change gear), a propeller shaft, a differential, an axle shaft and others. The respective wheels are mechanically coupled through the power transmission to the engine so as to be rotationally driven due to the power generated by the engine. Because of driving the respective wheels, the 4WD can double the driving force as compared with the 2WD, thereby improving the travelling safety, running performance and others in travelling on a road surface having a low (small) friction or a large travelling resistance.

There is a problem which arises with the conventional 4WD, however, in that, when the driving forces of all the wheels exceed the gripping force of the road surface due to rapid acceleration or the like, the acceleration slips occur in all the wheels so as to considerably deteriorate the travelling safety of the motor vehicle. Thus, to maintain travelling safety, it is preferable that the motor vehicle be equipped with both the 4WD and TRC. However, as described above, the conventional TRC is arranged to detect the occurrence of the acceleration slip of the drive wheel by the comparison between the rotational speeds of the driven wheel and the non-driven wheel, thereby making it difficult to simply combine both the 4WD and TRC. That is, for the TRC operation, the 4WD state is required to be switched to the 2WD state (the 4WD is not compatible with the TRC). Thus, the motor vehicle requires a complex and expensive absolute vehicle speed meter which can detects the occurrences of the acceleration slips in all the wheels.

SUMMARY OF THE INVENTION

It is therefore an object of the present invention to provide a wheel driving apparatus which is capable of providing the driving forces to the respective wheels irrespective of the TRC operation so as to improve the travelling safety of the motor vehicle.

According to this invention there is provided a drive apparatus for driving front and rear wheels of a motor vehicle either the front and rear wheels being mechanically driven, through a power transmission mechanism, by a motive power generated by an engine of the motor vehicle and the other wheels being driven by hydraulic motors rotationally driven by a hydraulic pump. A feature of the drive apparatus limits driving forces of the other wheels, rotationally driven by the hydraulic motor, to be below a predetermined driving force and further detects occurrences of acceleration slips of the one wheels, rotationally driven through the power transmission mechanism, on the basis of speeds of the other wheels in which the driving force is limited to be below the predetermined driving force. The driving forces of the one wheels are adjusted in accordance with the acceleration slip detection result so as to suppress the occurrences of the acceleration slips.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
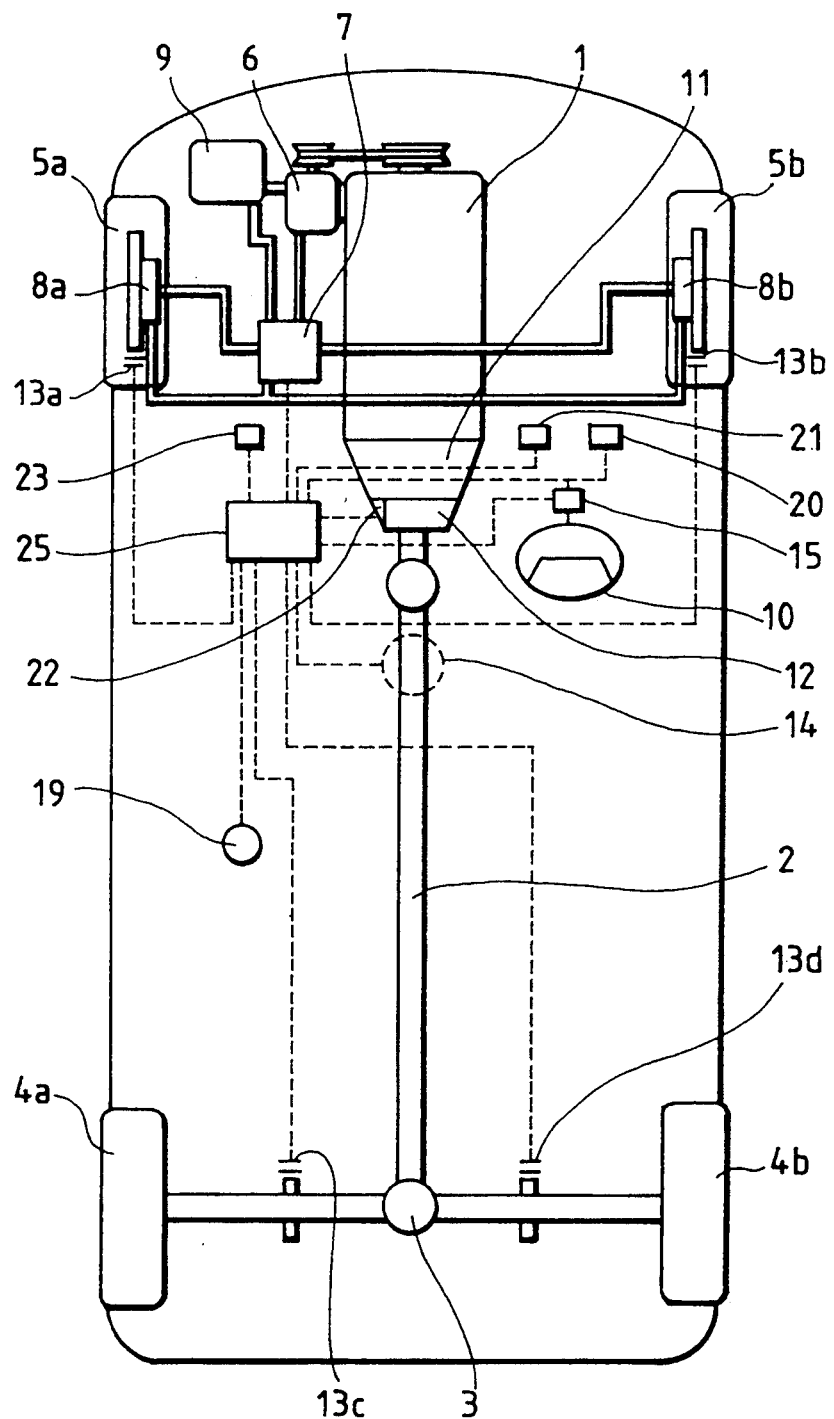
FIG. 1 shows an arrangement of a drive apparatus for a motor vehicle according to an embodiment of this invention.

FIG. 1 shows the entire arrangement of a wheel driving apparatus according to an embodiment of this invention. In FIG. 1, an engine 1, acting as a power source (prime mover), is coupled through a clutch 11 and a transmission 12 to a propeller shaft 2 which is in turn connected to a differential 3. As well known, the differential 3 is for performing the deceleration action, converting action and differential action. Due to this differential 3, the rotational driving force is transferred through a rear axle shaft to the rear left and right wheels designated at 4a and 4b. Further, the engine 1 is coupled through a pulley and a belt to a hydraulic pump 6 so that the hydraulic pump 6 is driven by the engine 1 so as to suck the operating oil from an oil tank 9 to discharge the operating oil having a pressure and quantity corresponding to the engine speed. The discharge opening of the hydraulic pump 6 is connected to a control valve assembly 7 whereby the operating oil discharged from the hydraulic pump 6 is adjustable in pressure by the control valve. The operating oil pressure-adjusted by the control valve assembly 7 is supplied to hydraulic motors 8a and 8b provided in the insides of the front left and right wheels 5a and 5b so as to drive the hydraulic motors 8a and 8b, whereby rotationally: driving forces are generated in the front left and right wheels 5a and 5b. After the generation of the rotationally driving forces in the front left and right wheels 5a and 5b, the operating oil supplied to the hydraulic motors 8a and 8b is discharged toward the oil tank 9.

For the front left and right wheels 5a and 5b, there are provided wheel speed sensors 13a and 13b which outputs detection signals corresponding to the rotational speeds of the front left and right wheels 5a and 5b. In addition, for detecting the rotational speeds of the rear left and right wheels 4a and 4b, wheel speed sensors 13c and 13d are provided on the rear axle shaft. Moreover, for detecting the running state of the motor vehicle, there are provided a vehicle speed sensor 14 for detecting the rotational speed of the propeller shaft to sense the speed of the motor vehicle, a steering angle sensor 15 for detecting the steering angle of a steering wheel 10, an acceleration sensor (accelerometer) 19 for detecting the accelerating state of the motor vehicle, a throttle sensor 20 for detecting the opening degree of a throttle valve to adjust the intake air quantity to the engine 1, a shifted-position sensor 22 for detecting the shifted position of the transmission 12, a brake sensor 21 for detecting the depressing state of a braking pedal, and an idle switch 23 for outputting a signal when the engine speed becomes the idling speed. The detection signal of these sensors are inputted to an electronic control unit (which will be referred hereinafter to as ECU) 25. The ECU 25 operates the control valve assembly 7 on the basis of the detection signal therefrom so that optimal driving forces are generated with respect to the front left and right wheels 5a and 5b.

Figure 2:
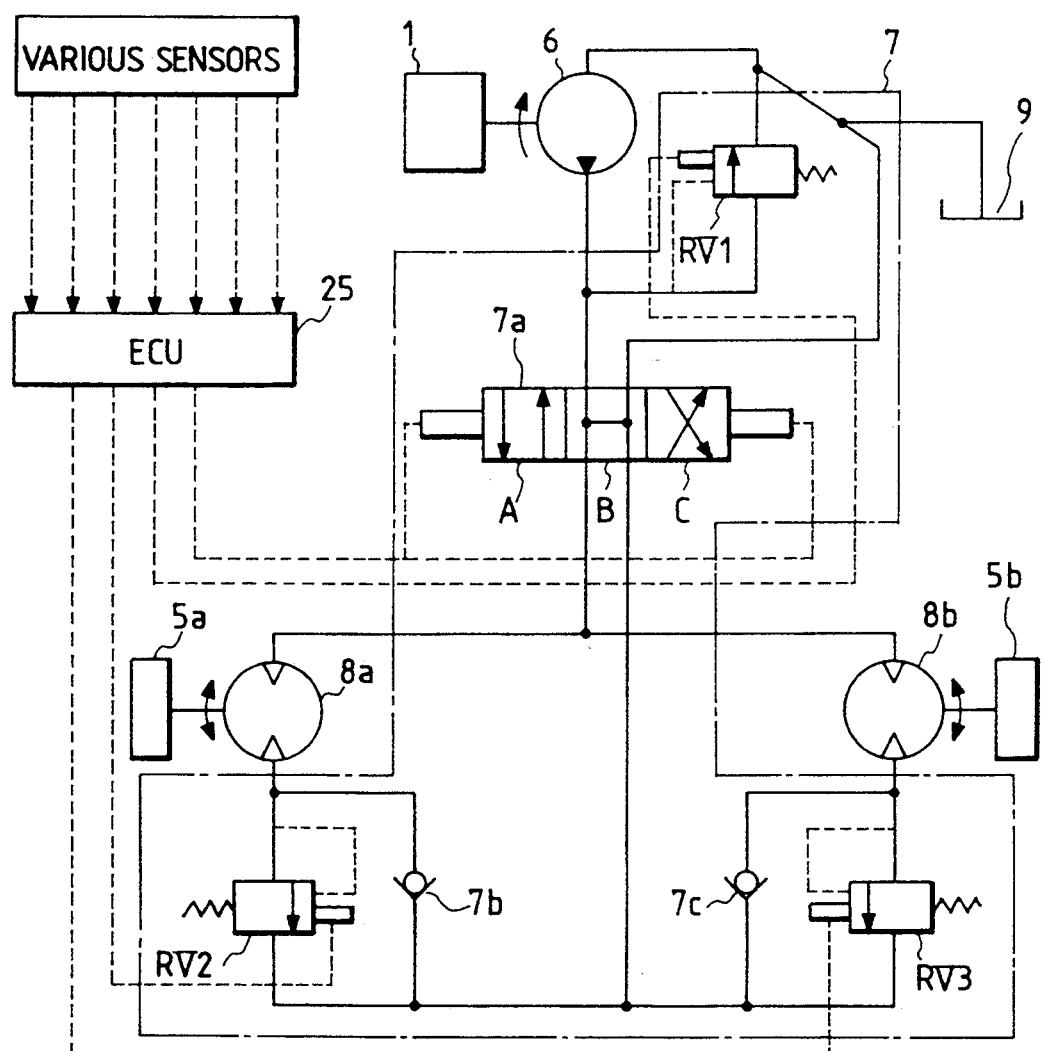
FIG. 2 shows an arrangement of a control valve of the FIG. 1 drive apparatus.

Secondly, a detailed arrangement and operation of the control valve 7 will be described hereinbelow with reference to FIG. 2. In FIG. 2, the control valve assembly 7 comprises a pressure control valve RV1, a directional control valve 7a, pressure control valves RV2, RV3 and check valves 7b, 7c. The pressure control valve RV1 is provided between the discharge side of the hydraulic pump 6 and the oil tank 9 so as to control the discharging pressure of the hydraulic pump 6 in accordance with a control signal outputted from the ECU 25. Here, an upper limit is set in advance with respect to the discharging pressure to be controlled by the pressure control valve RV1 so that the pressure control valve RV1 controls the discharging pressure of the hydraulic pump 6 in a range below the upper limit. This upper limit is set so that excessive acceleration slips do not occur in the front left and right wheels 5a and 5b even if the motor vehicle is running on a low-friction road surface when pressure is supplied to the hydraulic pumps 8a and 8b. Further, the directional control valve 7a is provided between the hydraulic pump 6 and the hydraulic motors 8a, 8b so as to selectively supply the operating oil from the hydraulic pump 6 to the hydraulic motors 8a, 8b and cut the supply thereto and further to switch the direction of the flow of the operating oil for the hydraulic motors 8a, 8b. That is, when the motor vehicle is stopping or when the driver is operating the brake pedal, the driving forces are not required to be generated with respect to the front left and right wheels 5a and 5b, and hence the directional control valve 7a is switched to take a B position so that the hydraulic pump 6 and the oil tank 9 are communicated with each other and the hydraulic pump 6 is rotatable in the unloaded state. On the other hand, when the motor vehicle is moving forwardly and when the driver does not operate the brake pedal, the directional control valve 7a is switched to take an A position so that the operating oil flow through the hydraulic motors 8a and 8b in the directions that the front left and right wheels 5a and 5b are driven in the positive rotational directions. Further, when the motor vehicle moves backwardly, the directional control valve 7a is switched to take a C position whereby the flow directions become reverse so that the front left and right wheels 5a and 5b is rotationally drive in the reverse directions.

The pressure control valves RV2 and RV3 are provided between the hydraulic motors 8a, 8b and the oil tank 9 so that, when a difference arises between the rotational speeds of the front left and right wheels 5a and 5b, the motive powers to be supplied to the hydraulic motors 8a and 8b are controlled so as to cancel the difference between the rotational speeds thereof. The reason that such control is required is as follows. That is, when excessive acceleration slips occur in the rear left and right wheels 4a and 4b, for ensuring the travelling stability of the motor vehicle, a high-pressure oil is applied to the hydraulic motors 8a and 8b so that the front left and right wheels 5a and 5b are driven by the hydraulic motors 8a and 8b. At this time, since the pressure to be controlled by the pressure control valve RV1 is arranged to have an upper limit, the driving forces of the front left and right wheels 5a and 5b take values whereby excessive acceleration slips do not occur, even if the motor vehicle is running on a low-friction road surface. However, when the motor vehicle is in an accelerated state, the acceleration slip always occurs to some degree, "It is well known that the gripping force between the wheel and the road surface has a maximum when the slip ratio is 15 to 20%". In this embodiment, the upper limit of the pressure control valve RV1 is set so as not to exceed the aforementioned slip ratio range even if the motor vehicle is running on a low-friction road surface. When the rotational speed difference occurs between the front left and right wheels 5a and 5b within the aforementioned slip ratio range, for example, when the rotational speed MFL of the front-left wheel 5a is higher than the rotational speed MFR of the front-right wheel 5b, the load of the hydraulic motor 8a relative to the hydraulic pump 6 is smaller than the load of the hydraulic motor 8b relative to the hydraulic pump 6 and hence most of the operating oil to be discharged from the hydraulic pump 6 is directed to the hydraulic motor 8a. As a result, the operating oil is not supplied to the hydraulic motor 8b so as to make it difficult to drive the front-right wheel 5b. Thus, as described above, when the rotational speed MFL of the front-left wheel 5a becomes higher, the front-left wheel side pressure control valve RV2 is operated to increase the front-left wheel side load, whereby the motive power can be supplied to the hydraulic motor 8b so as to rotationally drive the front left and right wheels 5a and 5b with adequate driving forces.

Figure 3:
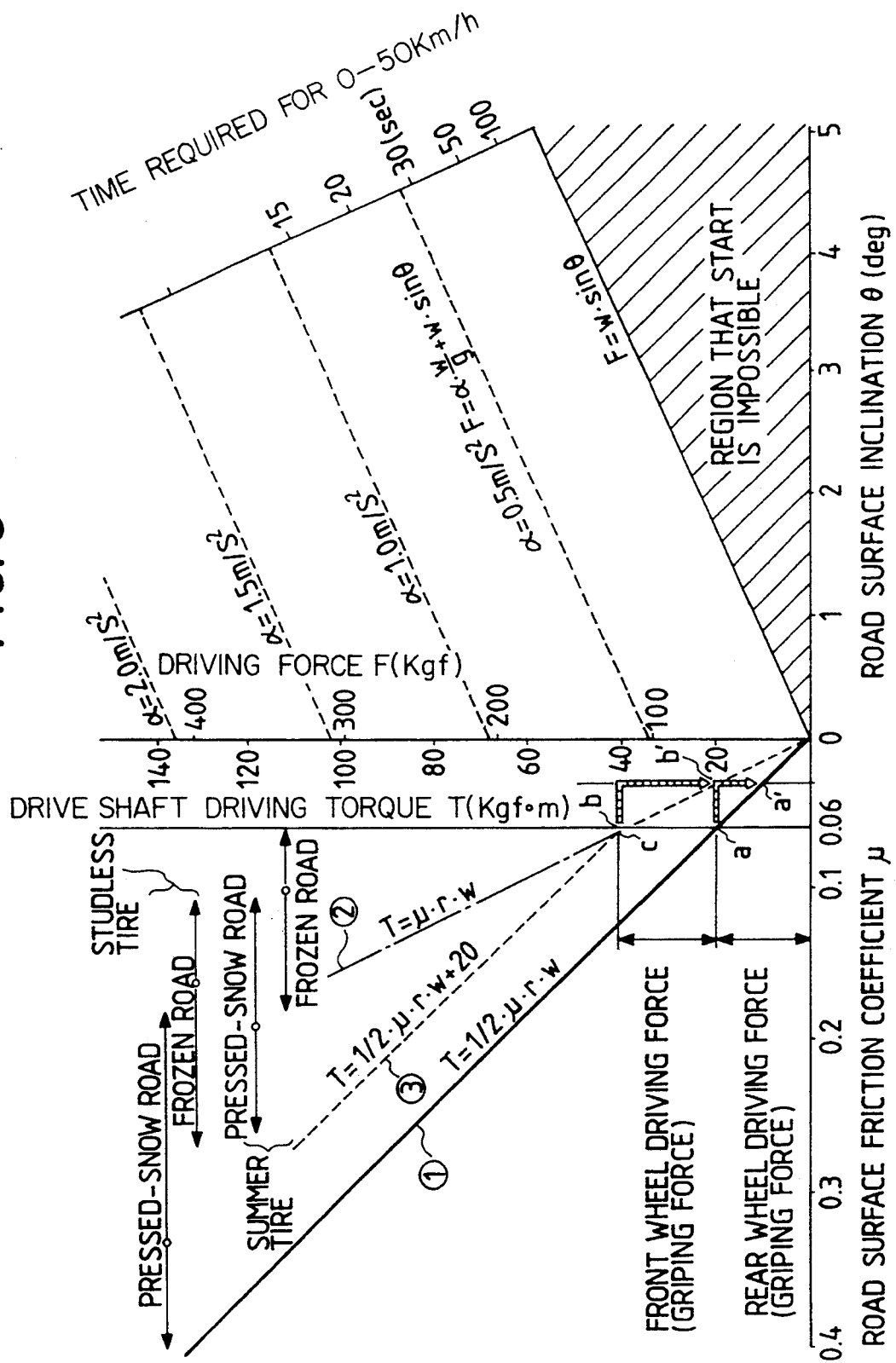
FIG. 3 is a graphic illustration for an operation of the FIG. 1 drive apparatus.

A description will be made hereinbelow in terms of setting the above-mentioned upper limit pressure, i.e., setting the upper limit motive force. In FIG. 3, the right side portion shows the driving force F for allowing the start of the motor vehicle with respect to an inclination angle $\theta$ of the road surface or shows the driving force F for allowing the generation of a predetermined acceleration $\alpha$. On the other hand, the left side portion shows the drive shaft driving torque T for allowing the transfer to the road surface. Numeral 1 surrounded by a circle represents the driving torque T in the case of a 2WD, numeral 2 surrounded by a circle designates the driving torque T in the case of a 4WD, and numeral 3 surrounded by a circle denotes the driving torque T in the case of the driving system according to embodiment. Here, the aforementioned driving force F is converted into the driving torque T taking into account the radius r of the wheel (the driving torque T = the wheel radius r × driving force F).

That is, the driving torque T' which can be transferred to the road surface by one wheel is as follows.

$$T = \mu \times r \times W/4$$

where W represents the weight of the motor vehicle and μ designates the friction coefficient of the road surface.

In the case of the 2WD, since the driven wheels are 2 in number, the driving torque $T_{2WD}$ is given as follows.

$$T_{2WD} = \mu \times r \times W/2$$

Further, in the case of the 4WD, the driving torque $T_{4WD}$ is given as follows.

$$T_{4WD} = \mu \times r \times W$$

On the other hand, in the drive system according to this embodiment, a driving torque can be obtained which is the sum of the driving torque $T_{2WD}$ of the 2WD and the driving torques of the front left and right wheels 5a and 5b.

Here, the minimum value of the friction coefficient μ of general road surfaces is considered as 0.06 (for example, the case that the tire of the motor vehicle is for summer and the motor vehicle is running on an icy road surface), and when a slip occurs, the road surface friction coefficient μ can be lowered to a value below 0.06 (for example, 0.03) which does not take place under the normal condition. In this case, in the 2WD the driving torque is lowered from a to a' and in the 4WD the driving torque is lowered from b to b', thereby making it difficult to start the motor vehicle. On the other hand, according to this embodiment, the maximum driving torques of the front left and right wheels 5a and 5b are set to, for example, 20 kgf*m corresponding to the minimum value of the road surface friction coefficient μ so that the excessive slip does not occur even if the motor vehicle is running on the road surface having the aforementioned low friction coefficient. Thus, since the driving torque can be insured by at least the front left and right wheels 5a and 5b and the motor vehicle can be started by the driving torque of the rear left and right wheels 4a and 4b in addition to the driving force of the front left and right wheels 5a and 5b, it is possible to improve the starting performance of the motor vehicle.

Returning to FIG. 2, the check valves 7b and 7c are respectively provided in parallel to the pressure control valves RV2 and RV3 in order to ensure the flow passages for the operating oil when the motor vehicle moves backwardly. Further, each of the pressure control valves RV1 to RV3 is equipped with a fail-safe mechanism to mechanically lower the control pressure when the control pressure exceeds a predetermined value.

Figure 4:
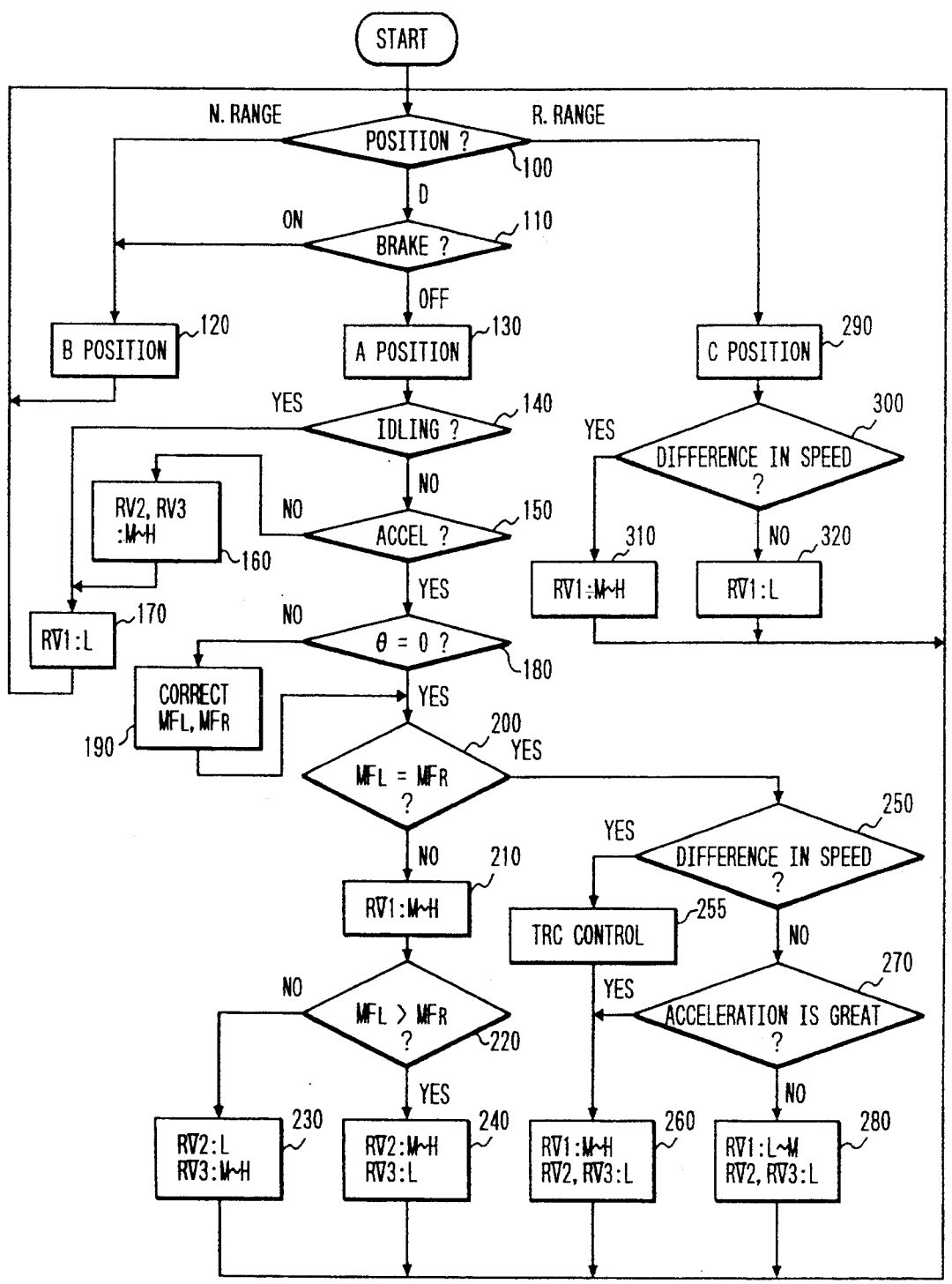
FIG. 4 is a flow chart showing a control procedure of an electronic control unit used in the Fig. I drive apparatus.

Moreover, a description will be made hereinbelow with reference to a flow chart of FIG. 4 in terms of the control valve 7 drive operation by the ECU 25 on the basis of the detection signals from various sensors. In FIG. 4, the operation first executes a step 100 to decide the shifted position of the transmission 12 on the basis of the detection signal of the shifted-position sensor 22. Here, in this embodiment, the motor vehicle is of an automatic gear type with the following shifting positions: a neutral range (N range), a drive range (D range) and a reverse range (R range). If the answer of the step 100 is that the shifted position of the transmission 12 is the N range, a step 120 follows to switch the directional control valve 7a to the B position, whereby the hydraulic pump 6 is communicated with the oil tank 9 so as to be operable in the unloaded state so that the driving forces do not occur with respect to the front left and right wheels 5a and 5b. On the other hand, if the answer of the step 100 is that the shifted position of the transmission 12 is the D range, a step 110 follows to check, on the basis of the detection signal of the brake sensor 21, whether or not the brake pedal is operated by the driver. If operated, there is no need to generate the driving forces to the front left and right wheels 5a and 5b, so a step 120 is executed in order to switch the directional control valve 7a to the A position. On the other hand, if not operated, a step 130 is executed to switch the directional control valve 7a to the A position. Thus, the operating oil can be supplied to the hydraulic motors 8a and 8b so that the hydraulic motors 8a and 8b are driven in the positive rotational directions.

A step 140 checks, on the basis of the detection signal of the idle switch 23, whether the rotational speed of the engine 1 is the idling rotational speed or above the idling rotational speed. When the engine 1 speed is substantially the idling speed, the front left and right wheels 5a and 5b do not require a large driving force. Accordingly, a step 170 is executed to control the pressure control valve RV1 so that the discharging pressure of the hydraulic pump 6 is low. On the other hand, if the engine 1 speed is above the idling speed, a step 150 checks, on the basis of the detection signal of the throttle sensor 20, whether the accelerating pedal is pressed or not. If not, a step 160 follows to control the pressure control valves RV2 and RV3 so that the operating oil will be between an intermediate pressure (M in FIG. 4) and a high pressure (H in FIG. 4) when applied to the hydraulic motors 8a and 8b. That is, in the case that the engine 1 speed is higher than the idling speed and the accelerating pedal is .not operated, it is determined that the motor vehicle is being slowly decelerated by the engine brake. Thus, in this. embodiment, the loads of the front left and right wheels 5a and 5b are increased by the pressure control valves RV2 and RV3 so that the engine brake effectively occurs.

If the decision of the step 150 is that the accelerating pedal is in the pressed state, a step 180 follows to check, on the basis of the detection signal of the steering angle sensor 15, whether the steering angle of the steering wheel 10 is substantially zero. If the decision of the step 180 is that the steering angle is not zero, it is determined that the motor vehicle is in turning state, and step 190 is executed in order to correct the rotational speeds of the front left and right wheels 5a and 5b in accordance with the turning state. That is, when the motor vehicle is in the turning state, the rotational speed of the outer wheel becomes higher than the rotational speed of the inner wheel. Accordingly, either the rotational speed of the front-left wheel 5a or the rotational speed of the front-right wheel 5b is multiplied by a correction coefficient on the basis of the turning radius of the motor vehicle, which can be estimated on the basis of the steering angle, so that the rotational speeds of the front left and right wheels 5a and 5b become equal to each other.

On the other hand, if the decision of the step 180 is that the steering angle is substantially zero or if the rotational speed of either the front-left wheel or front-right wheel is corrected in the step 190, the operation advances to a step 200 in order to check whether the rotational speeds of the front left and right wheels 5a and 5b are substantially equal to each other. If the the rotational speeds of the front left and right wheels 5a and 5b are different from each other, it is determined that an acceleration slip is occuring in one of the front left and right wheels 5a and 5b. Thus, firstly, a step 210 is executed to control the pressure control valve RV1 to cause the discharging pressure of the hydraulic pump 6 to take a value in a range between an intermediate pressure and a high pressure so as to increase the driving force of the wheel in which the acceleration slip does not occur. Thereafter, the operation proceeds to a step 220 to check whether the rotational speed MFL of the front-left wheel 5a is higher than the rotational speed MFR of the front-right wheel 5b. In the rotational speed MFL is lower than the rotational speed MFR, it is determined the acceleration slip occurs in the front-right wheel 5b. In this case, a step 230 is executed so that the control pressure of the front-left wheel side pressure control valve RV2 takes a low-pressure state (L in FIG. 4) and the control pressure of the front-right wheel side pressure control valve RV3 takes a value in a range between the intermediate pressure and the high pressure. Thus, the front-right wheel side load relative to the hydraulic pump 6 is increased whereby the operating oil is directed to the front-left wheel side. As a result, the motive power to be supplied to the hydraulic motor 8b for the front-right wheel 5b in which the acceleration slip occurs is decreased and the the motive power to be supplied to the hydraulic motor 8a for the front-left wheel 5a is increased, thereby supplying adequate drive forces to the front left and right wheels 5a and 5b.

If the decision of the step 220 is that the rotational speed MFL of the front-left wheel 5a is higher than the rotational speed MFR of the front right wheel 5b, it is determined that an acceleration slip occurs in the front left wheel 5a, thereby advancing to a step 240. Contrary to the step 230, in the step 240, the control pressure of the front-left wheel side pressure control valve RV2 is arranged to take a value in a range between an intermediate pressure and a high pressure and the control pressure of the front-right wheel side pressure control valve RV3 is arranged to be a low value, whereby the motive power to be supplied to the hydraulic motor 8b for the front-right wheel 5b is increased and the motive power to be supplied to the hydraulic motor 8a for the front-left wheel 5a is decreased so as to cancel the acceleration slip of the front left wheel 5a.

If the decision of the step 200 is that the rotational speeds of the front left and right wheels 5a and 5b are substantially equal to each other, the operation goes to a step 250 to check whether there is a difference between the average value of the rotational speeds of the front left and right wheels 5a, 5b and the average value of the rotational speeds of the rear left and right wheels 4a, 4b (in the case that the motor vehicle is in a turning state, the rotational speeds of the rear left and right wheels 5a and 5b, and the rear left and right wheels 4a and 4b are corrected). When a rotational speed difference is exists, it is considered as an acceleration slip in the rear left and right wheels 4a and 4b. Thus, for improving the travelling stability of the motor vehicle, the operation proceeds to a step 260 in which the pressure control valve RV1 is controlled so that the discharging pressure of the hydraulic pump 6 takes a value in a range between the intermediate pressure to the high pressure so as to increase the driving forces of the front left and right wheels 5a and 5b. On the other hand, if the rotational speed difference does not occur, the operation advances to a step 270 to decide, on the basis of the detection signal of the acceleration sensor 19, whether the acceleration of the motor vehicle is greater than a predetermined value. When the acceleration of the motor vehicle is greater than the predetermined value, the operation goes to the step 260 to enlarge the driving forces of the front left and right wheels 5a and 5b so as to improve the travelling stability of the motor vehicle.

If the decision of the step 270 is that the acceleration of the motor vehicle is smaller than the predetermined value, the operation advances to a step 280. In this case, the acceleration slip does not occur in all the wheels of the motor vehicle and the speed variation is small, and hence it is considered that the motor vehicle is in a stable state. At this time, it is not required that great driving forces are applied to the front left and right wheels 5a and 5b. Accordingly, in the step 280, the pressure control valve RV1 is controlled so that the discharging pressure of the hydraulic pump 6 takes a value in a range between the low pressure and the intermediate pressure and the control pressures of the pressure control valves RV2 and RV3 are arranged to be in the low pressure states.

On the other hand, if in the step 100 the shifted position of the transmission 12 is the R range, the operation advances to a step 290 to switch the directional control valve 7a to the C position so that the hydraulic motors 8a and 8b rotate in the reverse directions, whereby the operating oil discharged from the hydraulic pump 6 is supplied through the directional control valve 7a and the check valves 7b, 7c to the hydraulic motors 8a and 8b, thereafter proceeding to a step 300. As well as the step 250, in the step 300, it is checked whether there is a difference between the average value of the rotational speeds of the front left and right wheels 5a, 5b and the average value of the rotational speeds of the rear left and right wheels 4a, 4b. If there is the difference therebetween, the operation advances to a step 310 to control the pressure control valve RV1 so that the discharging pressure of the hydraulic pump 6 takes a value in a range between an intermediate pressure and a high pressure so as to enlarge the driving forces of the front left and right wheels 5a and 5b. On the other hand, if there is no difference, the operation proceeds to a step 320 to control the pressure control valve RV1 so that the discharging pressure of the hydraulic pump 6 takes a value in a range between a low pressure and an intermediate pressure. Here, when the shifted position of the transmission 12 is the R range, the control pressures of the pressure control valves RV2 and RV3 are arranged to always be low.

According to this invention, motive powers are mechanically supplied from a prime mover to either the front left and right wheels or the rear left and right wheels. Rotating motors are then provided for the other wheels. In the case that acceleration slips occur in the wheels mechanically driven by the prime mover, driving forces are supplied to the other wheels by means of the rotating motor. At this time, the driving forces are controlled to be below a predetermined upper limit value whereby an excessive acceleration slip does not occur even if the motor vehicle is running on a low-friction road surface. This upper limit value depends upon the tire mounted on the motor vehicle. For example, in the case of a radial tire for summer, since the possible minimum friction coefficient is about 0.06, the upper limit value is set to the maximum driving force for allowing the transfer to the road surface when the road surface friction coefficient is at the vicinity of 0.06. On the other hand, in the case of a spike tire, since the possible minimum friction coefficient is about 0.3, the upper limit value is set to the maximum driving force for allowing the transfer to the road surface when the road surface friction coefficient is at the vicinity of 0.3. Although the upper limit value varies in accordance with the tire mounted, the upper limit driving force is arranged to prevent the occurrence of an excessive acceleration slip in the other wheels. The value is considered to be 0.06 to 0.3. Thus, the other wheels can be driven by the driving force without the generation of the excessive acceleration slip. In addition, it is possible to detect the acceleration slip states of the first wheels, driven mechanically by the prime mover, on the basis of the rotational speeds of all the wheels.

Figure 5:
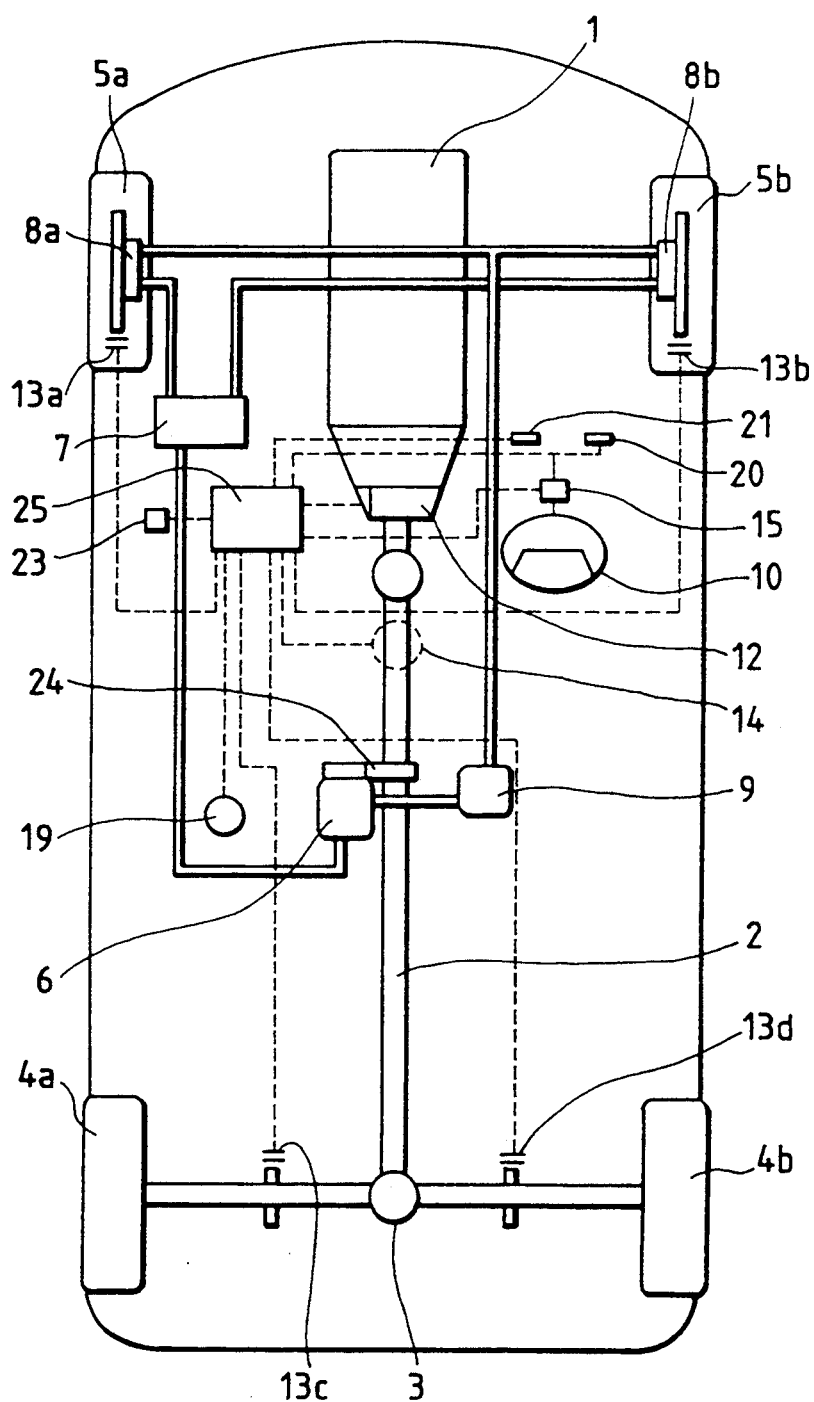
FIGS. 5 to 7 illustrate other embodiments of this invention.

Although in this embodiment the rear left and right wheels 4a and 4b are mechanically driven by the engine 1 and the front left and right wheels 5a and 5b are hydraulically driven, it is also appropriate to reverse the driving sources. Further, although the hydraulic pump 6 is rotationally driven by the engine 1 through the pulley and the belt, it is possible that the hydraulic pump 6 is driven by a gear or the like, or that as illustrated in FIG. 5 the hydraulic pump 6 is coupled through a gear 24 to the propeller shaft 2 so as to be rotationally driven by the rotating force of the propeller shaft 2. In this case, the rotational speed of the propeller shaft 2 and the rotational speeds of the rear wheels 4a, 4b are determined and hence it is possible to easily control the control valve 7. Further, since, when the motor vehicle moves backwardly, as well as the rear wheels 4a and 4b the propeller shaft 2 rotates in the reverse direction, it is possible to omit the directional control valve.

Figure 6:
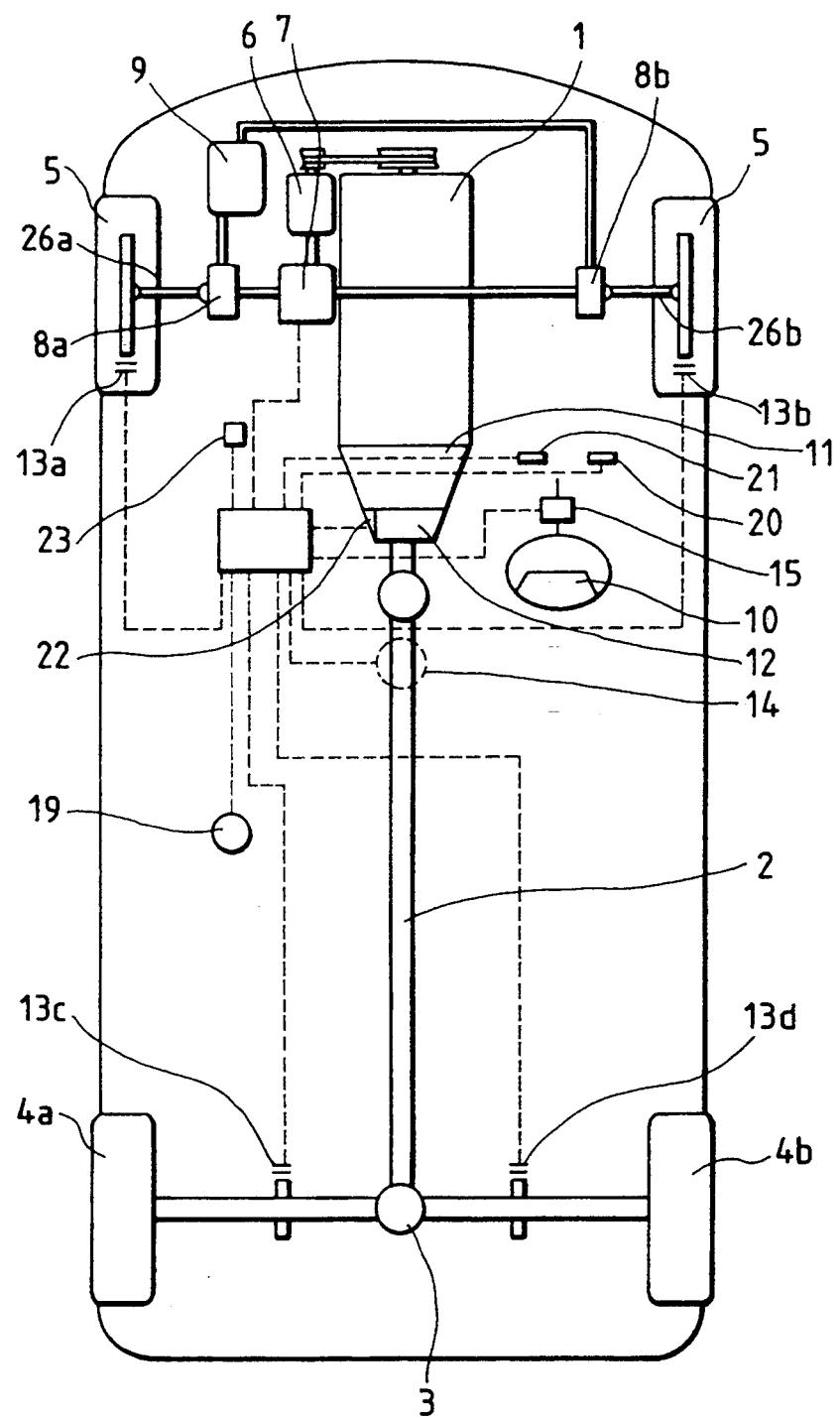

In addition, it is also appropriate that as illustrated in FIG. 6 the hydraulic motors 8a and 8b are not directly mounted on the front wheels 5a and 5b but mounted on portions of the vehicle body near the front wheels 5a and 5b or portions of the vehicle body near the engine 1 and the hydraulic motors 8a, 8b and the front wheels 5a, 5b are connected through drive shafts 26a, 26b. In this case, the hydraulic motors 8a and 8b can be mounted on a spring of the vehicle suspension, thereby improving the controllability, the drive feeling, and fuel consumption. Further, it is also appropriate that only one hydraulic motor is provided so that the wheels are rotationally driven by the hydraulic motor through the differential gear and the drive shaft.

Figure 7:
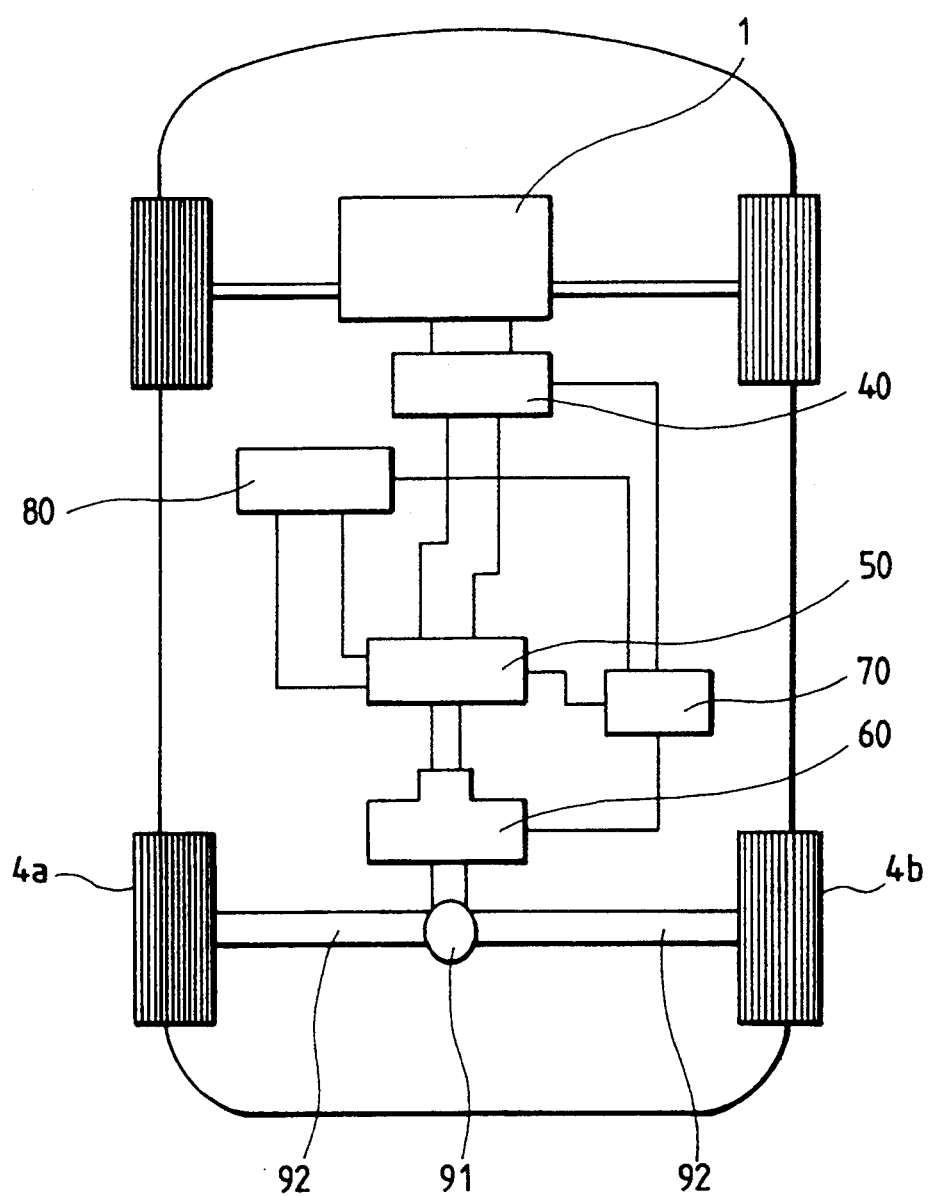

Still further, it is also appropriate that, as illustrated in FIG. 7, a generator 40 is coupled through, for example, a pulley and a belt to the engine 1 so that the rear left and right wheels 4a and 4b are rotationally driven by means of the electric energy developed by the generator 40. In this case, the aforementioned electric energy is supplied to a controller 50 so as to be controlled to be below the upper limit to prevent excessive; slips on general road surfaces, after being supplied to an electric motor 60. The electric motor 60 rotationally drives the rear wheels 4a and 4b through a differential 91 and a drive shaft 92 in accordance with the supplied electric energy. In FIG. 7, numeral 80 represents a battery for storing the electric energy generated by the generator 40 and for supplying the stored electric energy to the electric motor 60, and numeral 70 designates an ECU to output control signals to the generator 40, the controller 50, the electric motor 60 and the battery 80 and control the driving torques of the rear left and right wheels 4a and 4b to an optimal torque in a range below the upper limit on the basis of, for example, the detection signals of the steering angle sensor and wheel speed sensor.

In addition, it is appropriate that an acceleration sensor for detecting the acceleration of the motor vehicle is provided to estimate the road surface friction coefficient $\mu$ on the basis of the detected acceleration so as to control the drive torque of the wheel, driven by the motor, to be below a drive torque corresponding to the estimated value.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A four wheel drive apparatus for a motor vehicle, with a slip control system, comprising:
    a prime mover;
    a pair of front wheels;
    a pair of rear wheels;
    a power transmission mechanism coupled to said prime mover and to one of said front wheels and said rear wheels;
    a power source driven by said prime mover to generate an auxiliary power;
    a motor, coupled to said power source and responsive to said auxiliary power, and having an output coupled to another of said front wheels and said rear wheels;
    means for setting an upper limit on said auxiliary power, said upper limit being set to a value where excessive slip is reduced in said other of said front wheels and said rear wheels on a road surface having a low friction coefficient;
    means for detecting an occurrence of a slip condition in said one of said front wheels and said rear wheels based on wheel speeds of said one of said front wheels and said rear wheels and said other of said front wheels and said rear wheels;
    means for adjusting said auxiliary power on the basis of said detecting means so as to adjust driving forces applied to said other of said front wheels and said rear wheels, whereby the occurrence of said slip condition in said one of said front wheels and said rear wheels is suppressed;
    sensors for detecting a speed differential between a rotational speed of a left side and right side wheel of said other of said front wheels and said rear wheels; and
    means for controlling said motor so as to cancel said speed differential between said left side wheel and said right side wheel.

2. An apparatus as claimed in claim 1 wherein said power source driven by said prime mover comprises a hydraulic pump, and said motor comprises a hydraulic motor.

3. An apparatus as claimed in claim 2, wherein said setting means comprises a pressure control valve.

4. An apparatus as claimed in claim 1, wherein said one of said front wheels and said rear wheels are the rear-left and rear-right wheels of said motor vehicle and said other of said front wheels and said rear wheels are the front-left and front-right wheels.

5. An apparatus as claimed in claim 4, wherein said power source is mounted on a portion of a body of said motor vehicle in a vicinity of said front-left and front-right wheels or in a vicinity of said prime mover, and said apparatus further comprises a drive shaft coupled to said motor and to said other of said front wheels and said rear wheels.

6. An apparatus as claimed in claim 1, further comprising a propeller shaft connecting said power source and said prime mover.

7. A four wheel drive apparatus for a motor vehicle, with a slip control system, comprising:
- a prime mover;
- a pair of front wheels;
- a pair of rear wheels;
- a power transmission mechanism coupled to said prime mover and to one of said front wheels and said rear wheels;
- a generator driven by said prime mover to generate an auxiliary power;
- an electric motor, coupled to said generator and responsive to said auxiliary power, and having an output coupled to another of said front wheels and said rear wheels;
- means for setting an upper limit on said auxiliary power to be below a predetermined driving force;
- means for detecting an occurrence of a slip condition in said one of said front wheels and said rear wheels based on wheel speeds of said one of said front wheels and said rear wheels and said other of said front wheels and said rear wheels; and
- means for adjusting said auxiliary power on the basis of said detecting means so as to adjust driving forces applied to said other of said front wheels and said rear wheels, whereby the occurrence of said slip condition in said one of said front wheels and said rear wheels is suppressed.

8. A four wheel drive apparatus for a motor vehicle, with a slip control system, comprising:
- a prime mover;
- a pair of front wheels;
- a pair of rear wheels;
- a power transmission mechanism coupled to said prime mover and to one of said front wheels and said rear wheels;
- a generator driven by said prime mover to generate an auxiliary power;
- an electric motor, coupled to said generator and responsive to said auxiliary power, and having an output coupled to another of said front wheels and said rear wheels;
- means for setting an upper limit on said auxiliary power, said upper limit being set to a value where excessive slip in said other of said front wheels and said rear wheels on a road surface having a low friction coefficient is reduced;
- means for detecting an occurrence of a slip condition in said one of said front wheels and said rear wheels based on wheel speeds of said one of said front wheels and said rear wheels and said other of said front wheels and said rear wheels; and
- means for adjusting said auxiliary power on the basis of said detecting means so as to adjust driving forces applied to said other of said front wheels and said rear wheels, whereby the occurrence of said slip condition in said one of said front wheels and said rear wheels is suppressed.

* * * * *